J. W. TURNER.
Twine-Holder.
No. 206,984. Patented Aug. 13, 1878.
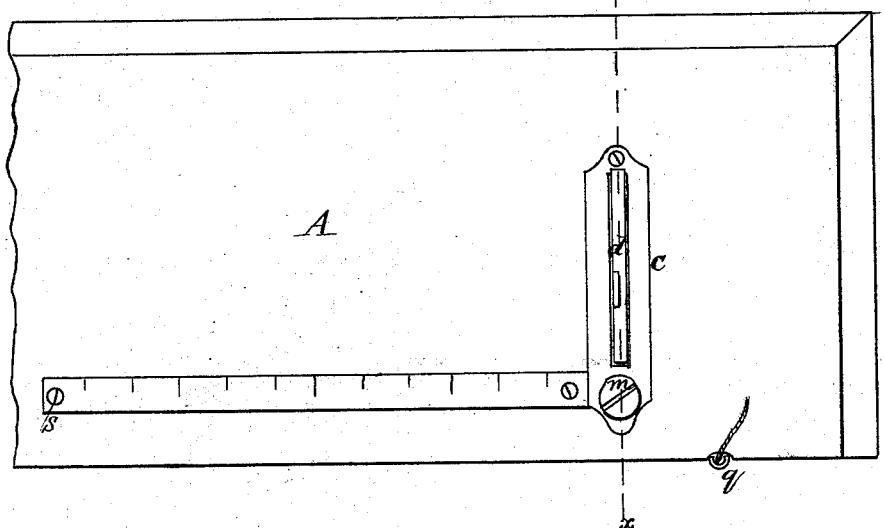
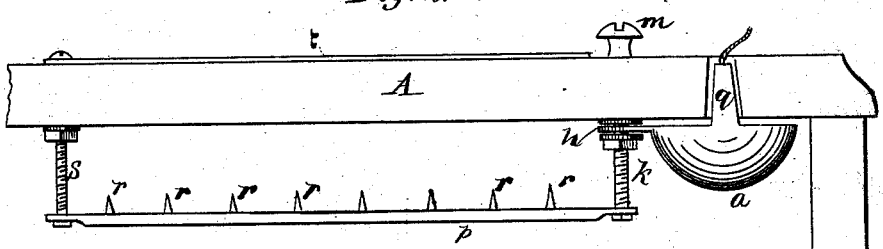
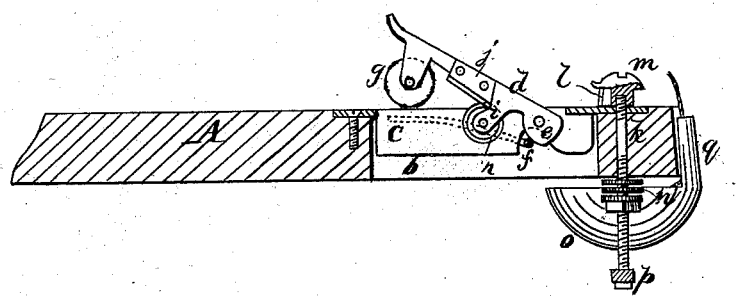
WITNESSES:
Henry N. Miller
C. Sedgwick
INVENTOR:
J. W. Turner
BY
ATTORNEYS.

UNITED STATES PATENT OFFICE.

JOHN W. TURNER, OF FORT WORTH, TEXAS.

IMPROVEMENT IN TWINE-HOLDERS.

Specification forming part of Letters Patent No. 206,984, dated August 13, 1878; application filed March 19, 1878.

*To all whom it may concern:*

Be it known that I, JOHN W. TURNER, of Fort Worth, in the county of Tarrant and State of Texas, have invented a new and Improved Counter Attachment, of which the following is a specification:

Figure 1 is a plan view of my improved counter attachment. Fig. 2 is a front elevation. Fig. 3 is a transverse section taken on line $x\ x$ in Fig. 1.

Similar letters of reference indicate corresponding parts.

The object of my invention is to provide a simple and inexpensive attachment to counters for measuring and cutting cloth and holding and cutting twine, and for holding wrapping-paper.

The invention will first be described in connection with the drawing, and then pointed out in the claim.

Referring to the drawing, A is an ordinary counter, in the top of which is formed a transverse slot, $b$, for receiving the frame $c$, that contains the pivoted arm $d$. This arm has a shoulder, $e$, which is acted on by the spring $f$, which holds the arm in either a vertical or horizontal position. A wheel, $g$, having a smooth rounded periphery, is pivoted between ears that project from the under surface of the arm $d$, near its free end, and a wheel, $h$, having a sharpened periphery, is pivoted between ears $i$, that project from the under surface of the arm $d$ near its pivot. The wheel $h$ is placed in contact with a shear-edged knife, $j$, which projects downward from the arm $d$.

Near the pivot of the arm $d$ a bolt, $k$, passes through the upper plate of the frame $c$ and through the counter-top. A knife, $l$, is attached to a cap, $m$, that is screwed on the end of $k$. This knife is intended for cutting twine and for cutting the edges of goods to be torn. The bolt $k$ projects downward below the counter-top to receive the ear $n$ of the twine-holder $o$, and also to receive one end of the paper-holding bar $p$. The twine-holder consists of a bowl of sufficient depth to hold a ball of twine. The said bowl is supported by the ear $n$, and is provided with a guide, $q$, for carrying the twine to the top of the counter. The twine-holder may be turned on the bolt $k$ whenever the twine is to be replenished.

The paper-holding bar $p$ is provided with a number of sharp points, $r$, that project in a vertical direction, and it is supported a short distance below the counter-top by the bolts $k\ s$, the bolt $k$ passing through the frame $c$, as already described, and the bolt $s$ passing through the counter-top and through a metallic yard-measure, $t$, placed on the top of the counter parallel to its edge and at right angles to the frame $c$.

When it is desired to cut twine or start the edge of cloth to be torn the knife $l$ is employed; but when cloth is to be cut through its entire width the arm $d$ is raised from the frame $c$ and the cloth is placed under it. The wheel $g$ is then allowed to press upon the goods as they are drawn forward between the edges of the blade $j$ and wheel or circular knife $h$ and are cut.

The paper used in wrapping is placed upon the points $r$ of the bar $p$. The cloth is measured by the metallic yard-measure in the usual way.

The cloth-cutter and paper-holder above described will form the subject-matter of subsequent applications for patents; but What I now claim, and desire to secure by Letters Patent, is—

The combination, with a store-counter, of the knife $l$, the twine-holder $o$, and the guide $q$, arranged as and for the purpose specified.

JOHN WILLIAM TURNER.

Witnesses:
J. K. MILLICAN,
W. J. SAUNDERS.